United States Patent
Manchineni

(10) Patent No.: US 9,923,783 B1
(45) Date of Patent: Mar. 20, 2018

(54) HARDWARE CONNECTION MANAGEMENT

(71) Applicant: International Business Machines Corporation, Armonk, NY (US)

(72) Inventor: Harikrishna Manchineni, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/401,030

(22) Filed: Jan. 7, 2017

(51) Int. Cl.
*H04L 12/24* (2006.01)

(52) U.S. Cl.
CPC .......... *H04L 41/24* (2013.01); *H04L 41/0213* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 6,098,103 A | 8/2000 | Dreyer et al. | |
| 8,976,667 B1 | 3/2015 | Dropps | |
| 9,037,748 B2 | 5/2015 | Nguyen et al. | |
| 2004/0085894 A1* | 5/2004 | Wang | H04L 41/0663 370/216 |
| 2006/0285499 A1 | 12/2006 | Tzeng | |
| 2010/0061253 A1 | 3/2010 | Kaminsky et al. | |
| 2012/0269093 A1 | 10/2012 | Grammel et al. | |
| 2012/0287939 A1* | 11/2012 | Leu | H04L 49/356 370/409 |
| 2014/0204780 A1 | 7/2014 | Yamada et al. | |

OTHER PUBLICATIONS

Manchineni, H., "Hardware Connection Management", U.S. Appl. No. 15/701,486, filed Sep. 12, 2017.
Accelerated Examination Support Document, U.S. Appl. No. 15/701,486, Sep. 8, 2017, 9 pgs.
IBM, List of IBM Patents or Patent Applications Treated as Related, Sep. 8, 2017, 2 pages.
Wikimedia Foundation, Inc; "Cisco Discovery Protocol"; <https://en.wikipedia.org/wiki/Cisco_Discovery_Protocol>.
Yadav, Sanjay; "PAUSE Frames:An Overview"; <http://mapyourtech.com/entries/general/pause-frames-an-overview>.
Ponnusamy, Parthiban; "Find Out Which Switch Port Connected to Server using tcpdump"; <http://www.lazysystemadmin.com/2011/09/find-out-which-switch-port-connected.html>.
Ghanwani et al.; "Definition for new PAUSE function"; <http://www.ieee802.org/1/files/public/docs2008/new-dcb-pelissier-pfc-proposal-0108.pdf>.

\* cited by examiner

*Primary Examiner* — Sulaiman Nooristany
(74) *Attorney, Agent, or Firm* — Nolan M. Lawrence

(57) ABSTRACT

Disclosed aspects relate to hardware connection management using a media access control (MAC) control frame. A MAC control frame may be generated by a hardware connection management engine. The MAC control frame may be routed from a first hardware port by the hardware connection management engine. The hardware connection management engine may determine whether a hardware switch exists between the first and second hardware ports based on whether a second hardware port receives the MAC control frame.

18 Claims, 5 Drawing Sheets

300

Begin 301

Generate a MAC control frame
330

Route the MAC control frame
(from a first hardware port)
360

Detect reception of the MAC control frame
(by the second hardware port)
370

Determine an absence
of the hardware switch
between the first
and second hardware ports
390

Send Network Data Traffic
391

Done 399

HARDWARE CONNECTION MANAGEMENT

BACKGROUND

This disclosure relates generally to computer systems and, more particularly, relates to hardware connection management using a media access control (MAC) control frame. MAC control frames may be used to facilitate connection between hardware. The use of hardware connections is increasing. As the amount of hardware connections increases, the need for hardware connection management using a MAC control frame may also increase.

SUMMARY

Aspects of the disclosure relate to hardware connection management using a media access control (MAC) control frame. MAC control frames may be sent through a source port and then checked at a destination port to see if the MAC control frame was received. In the event that the destination port does not receive the MAC control frame, it may be determined that the MAC control frame has been absorbed by a switch, and the presence of a switch located between the source port and the destination port may be ascertained. In the event that the destination port receives the MAC control frame, it may be determined that the MAC control frame has not been absorbed, and that the source port and the destination port are connected directly without a switch.

Disclosed aspects relate to hardware connection management using a media access control (MAC) control frame. A MAC control frame may be generated by a hardware connection management engine. The MAC control frame may be routed from a first hardware port by the hardware connection management engine. The hardware connection management engine may determine whether a hardware switch exists between the first and second hardware ports based on whether a second hardware port receives the MAC control frame.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3 is a flowchart illustrating a method of hardware connection management using a MAC control frame, according to embodiments.

Figure 1:
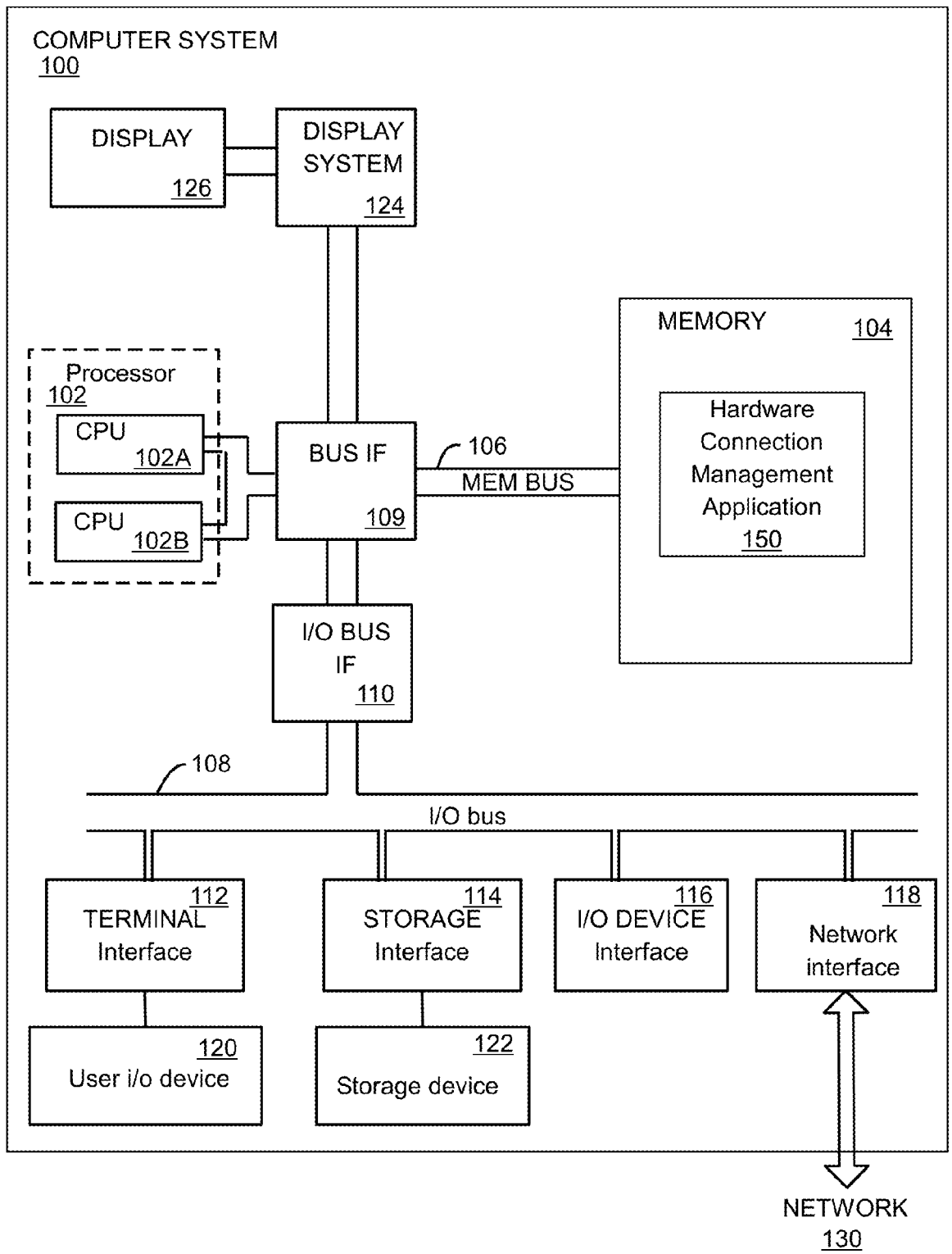
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to hardware connection management using a media access control (MAC) control frame. MAC control frames (e.g., pause frames or other types of MAC control frames) may be sent through a source port and then checked at a destination port to see if the MAC control frame was received. In the event that the destination port does not receive the MAC control frame, it may be determined that the MAC control frame has been absorbed by a switch (e.g., transparent switch), and the presence of a switch located between the source port and the destination port may be ascertained. In the event that the destination port receives the MAC control frame, it may be determined that the MAC control frame has not been absorbed, and that the source port and the destination port are connected directly without a switch. Leveraging a MAC control frame to determine the presence of a switch between hardware ports may be associated with data security, bandwidth efficiency, and application performance.

Hardware switches are one tool used in network environments to facilitate data transfer and routing between network elements. In some situations, network topology decisions (e.g., how hardware components are arranged in the network, how network data traffic is routed) may be based on the location of hardware switches. Aspects of the disclosure relate to the recognition that, in some situations, it may be unknown if two network points (e.g., hardware ports, Network Interface Card ports) are connected by a switch, or connected directly. Accordingly, aspects of the disclosure relate to utilizing a MAC control frame to ascertain whether a hardware switch is present between two hardware ports of a network. MAC control frames may be sent from a source hardware port to a destination hardware port, and the presence of a hardware switch between the two ports may be ascertained based on whether the MAC control frames were received by the destination hardware port. In this way, the physical and logical topology of network environments may be identified while maintaining network security and bandwidth efficiency.

Aspects of the disclosure include a system, method, and computer program product for hardware connection management using a media access control (MAC) control frame. A MAC control frame may be generated by a hardware connection management engine. The MAC control frame may be routed from a first hardware port by the hardware connection management engine. The hardware connection management engine may determine whether a hardware switch exists between the first and second hardware ports. The determination may be made based on whether a second hardware port receives the MAC control frame.

In embodiments, reception of the MAC control frame by the second hardware port may be detected by the hardware connection management engine. Based on reception of the MAC control frame by the second hardware port, an absence of the hardware switch between the first and second hardware ports may be determined by the hardware connection management engine. The absence of the hardware switch may indicate a direct connection between the first and second hardware ports. In embodiments, a lack of reception of the MAC control frame by the second hardware port may be detected by the hardware connection management engine. Based on the lack of reception of the MAC control frame by the second hardware port, a presence of the hardware switch between the first and second hardware ports may be determined. In embodiments, the MAC control frame may be structured by the hardware connection management engine to include a pause frame. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a hardware connection management application 150. In embodiments, the hardware connection management application 150 may include instructions or statements that execute on the processor 102 or instructions or statements that are interpreted by instructions or statements that execute on the processor 102 to carry out the functions as further described below. In certain embodiments, the hardware connection management application 150 is implemented in hardware via semiconductor devices, chips, logical gates, circuits, circuit cards, and/or other physical hardware devices in lieu of, or in addition to, a processor-based system. In embodiments, the hardware connection management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
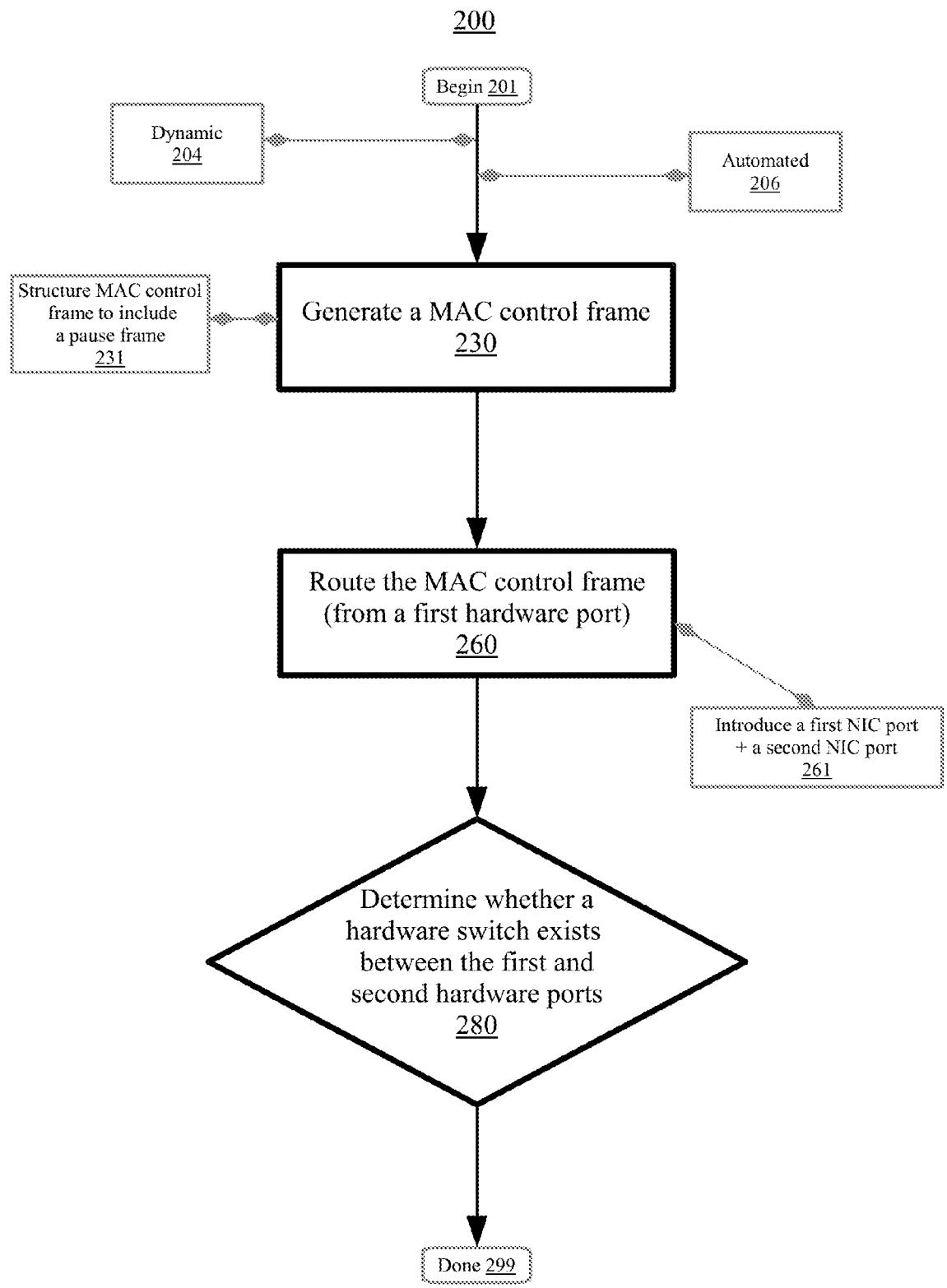
FIG. 2 is a flowchart illustrating a method of hardware connection management using a media access control (MAC) control frame, according to embodiments.

FIG. 2 is a flowchart illustrating a method 200 of hardware connection management using a media access control (MAC) control frame. Aspects of FIG. 2 relate to utilizing a MAC control frame to determine whether a hardware switch exists between first and second hardware ports of a hardware connection. The hardware switch may include a switching hub, bridging hub, MAC bridge, or other type of networking device configured to use packet switching techniques to receive, process, and forward network data traffic to a destination within a network. Aspects of the disclosure relate to the recognition that, in some computing environments (e.g., software development environments), it may not be known whether two or more hardware ports (e.g., Network Interface Card Ports) are connected directly or connected via a hardware switch (e.g., switching hub or MAC bridge configured to electronically and logically connect network devices). The connection configuration of hardware components may influence how traffic is routed through the network, which applications are hosted on which network nodes, bandwidth/computing resource allocation, and the like. Accordingly, aspects of the disclosure relate to using a MAC control frame to determine whether a transparent hardware switch exists between two hardware ports of a network. Leveraging a MAC control frame to determine the presence of a switch between hardware ports may be associated with data security, bandwidth efficiency, and application performance. The method 200 may begin at block 201.

In embodiments, the generating, the routing, the determining, and the other steps described herein may each occur in a dynamic fashion to streamline hardware connection management at block 204. For instance, the generating, the routing, the determining, and the other steps described herein may occur in real-time, ongoing, or on-the-fly. As an example, one or more steps described herein may be performed in an ongoing fashion (e.g., MAC control frames may be continuously/periodically transmitted from a first hardware port to a second port, or be interspersed with other types of data frames) in order to streamline (e.g., facilitate, promote, enhance) hardware connection management. Other methods of performing the steps described herein are also possible.

In embodiments, the generating, the routing, the determining, and the other steps described herein may each occur in an automated fashion without user intervention at block 206. In embodiments, the generating, the routing, the determining, and the other steps described herein may be carried out by an internal hardware-connection management module maintained in a persistent storage device of a local host node (e.g., Network Interface Card) or locally connected hardware device. In embodiments, the generating, the routing, the determining, and the other steps described herein may be carried out by an external hardware connection management module hosted by a remote computing device or server (e.g., accessible via a subscription, usage-based system, or other service model). In this way, aspects of hardware-connection management may be performed using automated computing machinery without user intervention or manual action. Other methods of performing the steps described herein are also possible.

At block 230, a MAC control frame may be generated by a hardware connection management engine. Generally, generating can include producing, assembling, structuring, formatting, establishing, or otherwise creating the MAC control frame by the hardware connection management engine. The hardware connection management engine may include a device-driver manager configured to facilitate installation of up-to-date device drivers to different components of the network environment. In embodiments, the hardware connection management engine may include a service processor to monitor the physical and logical configuration of various components of the network environment. The hardware connection management engine may be configured to track and monitor data traffic communicated between devices of the network environment. In embodiments, the MAC control frame may include a data packet of an Ethernet connection that includes a preamble, header, payload, frame check sequence, and an end of frame (e.g., footer) sequence. The MAC control frame may include a type value identifier that indicates itself as a MAC control frame to other devices in the network. For instance, in certain embodiments, MAC control frames may be marked with a hexadecimal type value identifier of "0x8808." When parsed by MAC control software (e.g., of a receiving device), the frame may be analyzed, and operation codes carried in the data field of the MAC control frame may be performed in response to identifying the type value identifier of "0x8808." In embodiments, generating the MAC control frame may include using a software application to format an Ethernet packet as a MAC control frame. As an example, a raw socket program or layer-2 device driver may request that a particular port (e.g., NIC port) initiates transmission of a MAC control frame. Accordingly, an Ethernet packet may be formatted with a hexadecimal type value identifier of "0x8808," and one or more operation codes may be stored in the data field. The MAC control frame may then be transmitted to a destination port corresponding to another hardware device in the network environment. Other methods of generating the MAC control frame using the hardware management engine are also possible.

In embodiments, the MAC control frame may be structured to include a pause frame at block 231. The MAC control frame may be structured to include the pause frame by the hardware connection management engine. Generally, structuring can include assembling, organizing, formatting, arranging, constructing, or otherwise configuring the MAC control frame to include a pause frame. The pause frame may include a type of Ethernet data packet configured to allow an interface or switch port to send a signal requesting a short pause in frame transmission. The pause frame may halt frame transmission from a sender (e.g., first hardware port) for a specified period of time. In embodiments, structuring the MAC control frame to include the pause frame may include formatting a data packet to have a particular MAC control opcode identifying the data packet as a pause frame as well as a pause time parameter that designates the length of time for which frame transmission may be halted. In certain embodiments, the MAC control opcode and the pause time parameter may be expressed in hexadecimal notation. As an example, in certain embodiments, a data packet may be structured to include a MAC control opcode of "0x0001" (e.g., opcode that identifies the data packet as a pause frame) and a pause time of "0x0002" (e.g., indication that frame transmission should be paused for two pause quantas, or 1024 total bit times). Other methods of structuring the MAC control frame to include a pause frame are also possible.

At block 260, the MAC control frame may be routed from a first hardware port. The MAC control frame may be routed by the hardware connection management engine. Generally, routing can include transmitting, conveying, relaying, directing, conducting, or otherwise sending the MAC control frame from the first hardware port. The first hardware port may include an interface between a first computing device (e.g., node, server) of the network environment and other computers or peripheral devices of the network. In embodiments, the first hardware port may include a male or female port configured to support one or more communication protocols. The first hardware port may include a serial port, a parallel port, a hot-swappable port, a plug-and play port, or other type of port. As an example, the first hardware port may include a Network Interface Card (NIC) port configured to connect a computer workstation or server to another computing device (e.g., second hardware port of a second computing device). In embodiments, routing the MAC control frame from the first hardware port may include assigning a destination address (e.g., logical location of the intended destination for the MAC control frame) and a source address (e.g., logical location corresponding to the first computing device/first hardware port) to the MAC control frame, and transmitting the MAC control frame using a hardware connection linked with the first hardware port. Other methods of routing the MAC control frame from the first hardware port are also possible.

In embodiments, the introduction of a first and second Network Interface Card (NIC) port may occur at block 261. A first NIC port may be introduced for the first hardware port. Similarly, a second NIC port may be introduced for a second hardware port as described herein. Generally, introducing can include establishing, instantiating, structuring, including, utilizing, or installing the first and second NIC ports. The first and second NIC ports may include physical interfaces for facilitating connection between different computing devices of a network environment. In embodiments, the first NIC port may correspond to a first network interface card (e.g., also called a network controller) of a first computing device, and the second NIC port may correspond to a second network interface card of a second computing device. The first and second network interface cards may be configured to implement the electronic circuitry and computer logic elements used to facilitate data traffic communication between computing devices of the network. In embodiments, the first and second network interface cards may use a specific physical layer and one or more data link layer standards such as Ethernet, Fibre Channel, Wi-Fi, or other communication protocols to transmit data between the first NIC port of the first computing device and the second NIC port of the second computing device. The first and second NIC ports may allow for cable-based or wireless data routing between computing devices of the network environment. In embodiments, introducing the first and second NIC ports may include enabling the first and second NIC ports for communication. As an example, both the first and second network interface cards may be configured to add the first and second NIC ports, respectively, to a list of enabled ports such that a hardware connection between the first and second NIC ports may be used for data traffic transmission and routing between the first computing device, the second computing device, and other devices of the network. Other methods of introducing the first and second NIC ports are also possible.

At block 280, the hardware connection management engine may determine whether a hardware switch exists between the first and second hardware ports. The hardware connection management engine may make the determination based on whether a second hardware port receives the MAC control frame. As described herein, aspects of the disclosure relate to the recognition that in some situations, it may not be known whether two or more hardware ports are connected directly or connected via a transparent hardware switch. Accordingly, aspects of the disclosure relate to transmitting a MAC control frame to determine whether a transparent switch exists between two hardware ports of a network. Generally, determining can include resolving, deriving, computing, detecting, identifying, discovering, or otherwise ascertaining whether a hardware switch exists between the first and second hardware ports. In embodiments, determining whether the hardware switch exists between the first and second hardware ports may include ascertaining whether the MAC control frame was received by a second hardware port. The second hardware port may include a destination port linked with the first hardware port via a hardware connection (e.g., Ethernet cable, wireless local area connection). In the event that the hardware management controller ascertains that a MAC control frame was received by the second hardware port, it may be determined that a hardware switch does not exist between the first hardware port and the second hardware port, and thus the first and second hardware ports are connected directly (e.g., back-to-back). In the event that the hardware management controller ascertains that a MAC control frame was not received by the second hardware port, it may be determined that a hardware switch does exist between the first hardware port and the second hardware port (e.g., the MAC control frame was absorbed by an intermediary hardware switch). In embodiments, determining whether a hardware switch exists between the first and second hardware ports may include parsing the network traffic (e.g., data packets) received by the second hardware port, and ascertaining whether a data packet including a specified type value identifier or a data packet including a designated MAC control opcode has been received by the second hardware port. As described herein, in the event that a data packet with the specified type value identifier or designated MAC control opcode has been received, it may be ascertained that the first and second hardware ports are directly connected, and in the event that a data packet with the specified type value identifier or designated MAC control opcode has not been received, it may be ascertained that a hardware switch exists between the first and second hardware ports. Other methods of determining whether a hardware switch exists between the first and second hardware ports are also possible.

Consider the following example. A network environment may include a first computing device having a first hardware port, and a second computing device having a second hardware port. The first and second hardware ports may be linked via a hardware connection including an Ethernet cable. As described herein, it may be unknown whether the first computing device and the second device are connected directly, or whether a transparent switch (e.g., router, hub) exists between the first and second hardware ports. Accordingly, as described herein, a MAC control frame including a pause frame may be generated by a hardware connection management engine (e.g., network interface card of the first computing device), and routed to the second hardware port of the second computing device using the hardware connection. In embodiments, the second computing device may analyze the network data traffic received using the hardware connection, and ascertain whether any of the received data packets correspond to a MAC control frame. In the event that a data packet corresponding to a MAC control frame was received by the second hardware port, it may be ascertained that a hardware switch between the first and second hardware ports does not exist. In the event that a data packet corresponding to a MAC control frame was not received by the second hardware port, it may be ascertained that a transparent hardware switch between the first and second hardware ports does not exist (e.g., the hardware switch absorbed the MAC control frame). Accordingly, in certain embodiments, the physical or logical topology of the network may be modified based on the determination of whether or not the hardware switch exists between the first and second hardware ports (e.g., one or more hardware components may be relocated, virtual machines or workloads may be migrated, data traffic may be rerouted).

Method 200 concludes at block 299. As described herein, aspects of method 200 relate to utilizing a MAC control frame to determine whether a hardware switch exists between first and second hardware ports of a hardware connection. Aspects of method 200 may provide performance or efficiency benefits for managing hardware connections using a MAC control frame. As an example, in response to detecting a hardware switch located between a first and second hardware port, data traffic associated with a time-sensitivity factor may be rerouted along a different hardware connection that does not include a hardware switch (e.g., hardware switches may be associated with additional data traffic latency) to expedite delivery of the data traffic. Altogether, leveraging a MAC control frame to determine the presence of a switch between hardware ports may be associated with data security, bandwidth efficiency, and application performance.

FIG. 3 is a flowchart illustrating a method 300 of hardware connection management using a MAC control frame. Aspects of FIG. 3 relate to determining an absence of a hardware switch between first and second hardware ports based on detecting reception of a MAC control frame. Aspects of method 300 may be similar or the same as aspects of method 200, and aspects may be utilized interchangeably with one or more methodologies described herein. The method 300 may begin at block 301. At block 330, a MAC control frame may be generated by a hardware connection management engine. At block 360, the MAC control frame may be routed from a first hardware port. The MAC control frame may be routed by the hardware connection management engine.

At block 370, reception of the MAC control frame by the second hardware port may be detected by the hardware connection management engine. Generally, detecting can include sensing, recognizing, discovering, distinguishing, ascertaining, or otherwise determining reception of the MAC control frame by the second hardware port. In embodiments, detecting reception of the MAC control frame may include utilizing the hardware connection management engine to analyze the network data traffic received by the second hardware port, and ascertaining whether any of the received data packets correspond to a MAC control frame. In embodiments, analyzing the network data traffic may include examining one or more (e.g., each) data packets of the network data traffic received by the second hardware port, and parsing a type value identifier or a MAC control opcode included in the data packet. For instance, a type value identifier and a MAC control opcode included in the byte data field of the data packet may be parsed and compared to established type value identifiers and MAC control opcodes for MAC control frames. As an example, detecting reception of the MAC control frame may include ascertaining that a type value identifier of the data packet matches an established type value identifier of "0x8808," (e.g., type value identifier of a MAC control frame) or that a control opcode of the data packet matches an established MAC control frame opcode of "0x0001" (e.g., opcode of a pause frame). In response to ascertaining that either the type value identifier matches the established type value identifier of "0x8808," or the MAC control opcode matches the established MAC control opcode of "0x0001," reception of the MAC control frame by the second hardware port may be detected. Other methods of detecting reception of the MAC control frame by the second hardware port are also possible.

At block 390, an absence of the hardware switch between the first and second hardware ports may be determined by the hardware connection management engine. The absence of the hardware switch between the first and second hardware ports may be determined based on the reception of the MAC control frame by the second hardware port. Generally, determining can include resolving, deriving, computing, detecting, identifying, discovering, or otherwise ascertaining the absence of the hardware switch between the first and second hardware ports. The absence of the hardware switch may indicate that the first and second hardware ports are directly connected (e.g., back-to-back) to one another without bypassing a router, hub, or other type of switch. In embodiments, determining the absence of the hardware switch may include detecting reception of the MAC control frame by the second hardware port, and ascertaining that this indicates the absence of the hardware switch (e.g., had a hardware switch been present, the MAC control frame may have been absorbed by the hardware switch and not reached the second hardware port). Other methods of determining the absence of the hardware switch between the first and second hardware ports are also possible.

In embodiments, a set of network data traffic may be sent across the first and second hardware ports at block 391. The set of network data traffic may be sent across the first and second hardware ports without utilizing the hardware switch (e.g., the hardware switch is absent or otherwise not present). As described herein, aspects of the disclosure relate to the recognition that, in the event that a hardware switch is absent between the first and second hardware ports, a set of network data traffic may be sent directly between computing devices without passing through a router, hub, or other type of hardware switch. Generally, sending may include transmitting, conveying, relaying, directing, conducting, or otherwise routing the set of network data traffic across the first and second hardware ports. The set of network data traffic may include a volume of data or information moving across one or more connections of the network at a given time. In embodiments, the set of network data traffic may include a number of data packets, frames, tuples, or other types of structured data. In embodiments, sending the set of network data traffic may include prioritizing the transmission of data traffic associated with a time sensitivity factor (e.g., data that may be adversely affected as time goes on, data that should be delivered to a destination as quickly as possible) across the first and second hardware ports without utilizing the hardware switch (e.g., the absence of a hardware switch may be associated with reduced latency data transmission with respect to hardware connections that include hardware switches). Other methods of sending the set of data traffic across the first and second hardware ports without utilizing the hardware switch are also possible. Method 300 concludes at block 399. Aspects of method 300 may provide performance or efficiency benefits (e.g., data security, bandwidth efficiency, and application performance) for managing hardware connection using a MAC control frame.

Figure 4:
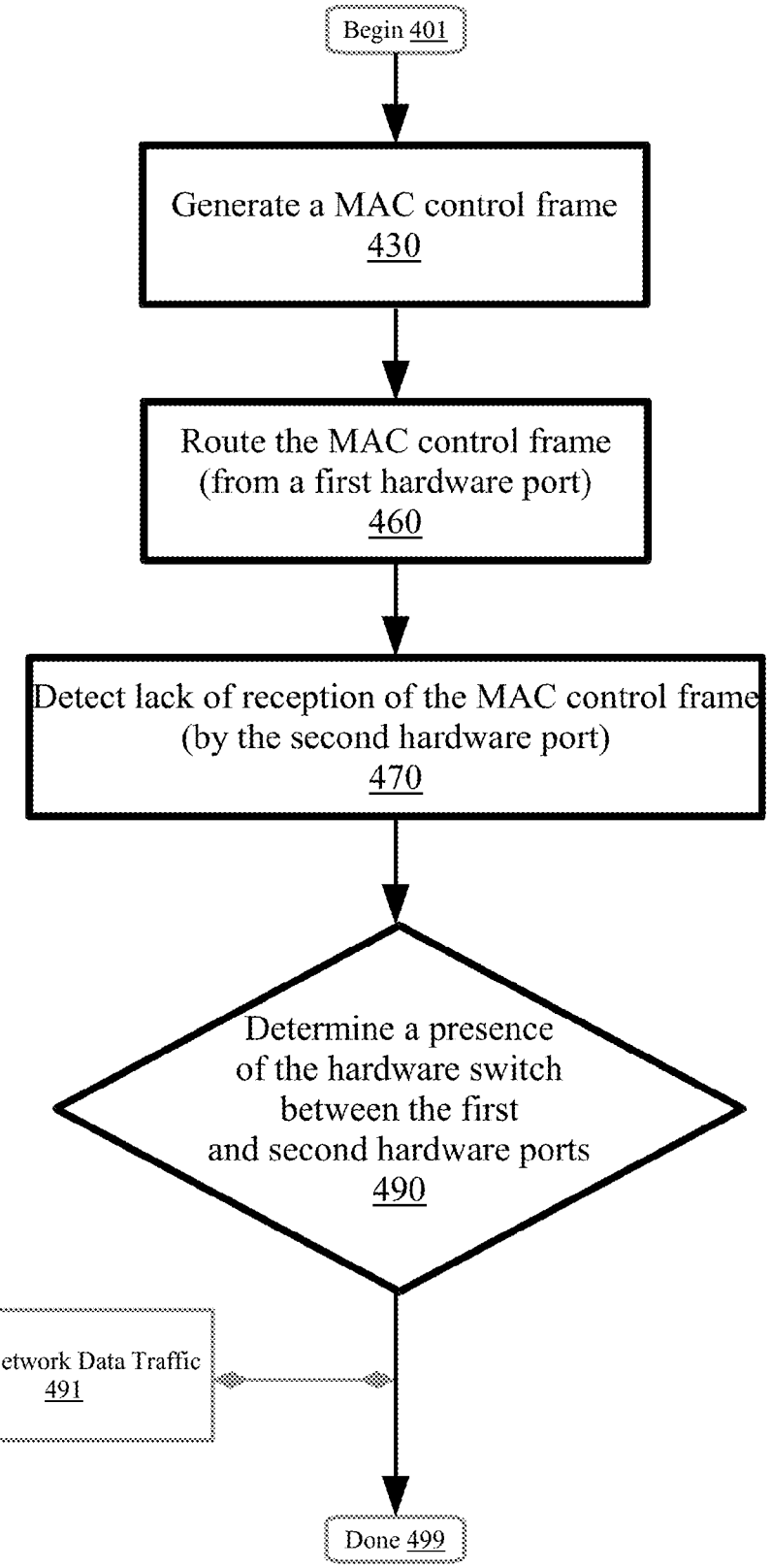
FIG. 4 is a flowchart illustrating a method of hardware connection management using a MAC control frame, according to embodiments.

FIG. 4 is a flowchart illustrating a method 400 of hardware connection management using a MAC control frame. Aspects of FIG. 4 relate to determining a presence of a hardware switch between the first and second hardware ports based on detecting lack of reception of a MAC control frame. Aspects of method 400 may be similar or the same as aspects of method 200, and aspects may be utilized interchangeably with one or more methodologies described herein. The method 400 may begin at block 401. At block 430, a MAC control frame may be generated by a hardware connection management engine. At block 460, the MAC control frame may be routed from a first hardware port. The MAC control frame may be routed by the hardware connection management engine.

At block 470, a lack of reception of the MAC control frame may be detected by the hardware connection management engine. The lack of reception of the MAC control frame by the second hardware port may be detected. Generally, detecting can include sensing, recognizing, discovering, distinguishing, ascertaining, or otherwise determining lack of reception of the MAC control frame by the second hardware port. In embodiments, detecting lack of reception of the MAC control frame may include utilizing the hardware connection management engine to analyze the network data traffic received by the second hardware port, and ascertaining whether any of the received data packets correspond to a MAC control frame. In embodiments, analyzing the network data traffic may include examining one or more (e.g., each) data packets of the network data traffic received by the second hardware port within a specified temporal period (e.g., 30 seconds, 1 minute, 5 minutes), and parsing a type value identifier or a MAC control opcode included in the data packet. For instance, a type value identifier and a MAC control opcode included in the byte data field of the data packet may be parsed and compared to established type value identifiers and MAC control opcodes for MAC control frames. As an example, detecting lack of reception of the MAC control frame may include ascertaining that a type value identifier of the data packet mismatches (e.g., diverges from, is inconsistent with) an established type value identifier of "0x8808" (e.g., type value identifier of a MAC control frame) or that a control opcode of the data packet mismatches an established MAC control frame opcode of "0x0001" (e.g., opcode of a pause frame). In response to ascertaining that the type value identifier mismatches the established type value identifier of "0x8808," or that the MAC control opcode mismatches the established MAC control opcode of "0x0001," lack of reception of the MAC control frame by the second hardware port may be detected. Other methods of detecting lack of reception of the MAC control frame by the second hardware port are also possible.

At block 490, a presence of the hardware switch between the first and second hardware ports may be determined by the hardware connection management engine. The hardware connection management engine may determine the presence of the hardware switch based on the lack of reception of the MAC control frame by the second hardware port. Generally, determining can include resolving, deriving, computing, detecting, identifying, discovering, or otherwise ascertaining the presence of the hardware switch between the first and second hardware ports. The presence of the hardware switch may indicate that the first and second hardware ports are indirectly connected to one another through a router, hub, or other type of hardware switch. In embodiments, determining the presence of the hardware switch may include detecting lack of reception of the MAC control frame by the second hardware port, and ascertaining that this indicates the presence of the hardware switch (e.g., the hardware switch absorbed the MAC control frame, such that it did not reach the second hardware port). Other methods of determining the presence of the hardware switch between the first and second hardware ports are also possible.

In embodiments, a set of network data traffic may be sent across the first hardware port, the hardware switch, and the second hardware port at block 491. As described herein, aspects of the disclosure relate to the recognition that, in the event that a hardware switch is present between the first and second hardware ports, it may be desirable to modify the physical or logical topography of the network or reconfigure network traffic routing parameters based on the presence of the hardware switch. Generally, sending may include transmitting, conveying, relaying, directing, conducting, or otherwise routing the set of network data traffic across the first hardware port, the hardware switch, and the second hardware port. The set of network data traffic may include a volume of data or information moving across one or more connections of the network at a given time. In embodiments, the set of network data traffic may include a number of data packets, frames, tuples, or other types of structured data. In embodiments, sending the set of network data traffic may include prioritizing the transmission of data traffic associated with high bandwidth requirements or complex data paths across the first hardware port, the hardware switch, and the second hardware port (e.g., the presence of a hardware switch may be associated with higher bandwidth thresholds as the hardware switch can route data across different communication channels and provide additional routing functionality to manage network data traffic). Other methods of sending the set of data traffic across the first hardware port, the hardware switch, and the second hardware port are also possible. Method 400 concludes at block 499. Aspects of method 400 may provide performance or efficiency benefits (e.g., data security, bandwidth efficiency, and application performance) for managing hardware connection using a MAC control frame.

Figure 5:
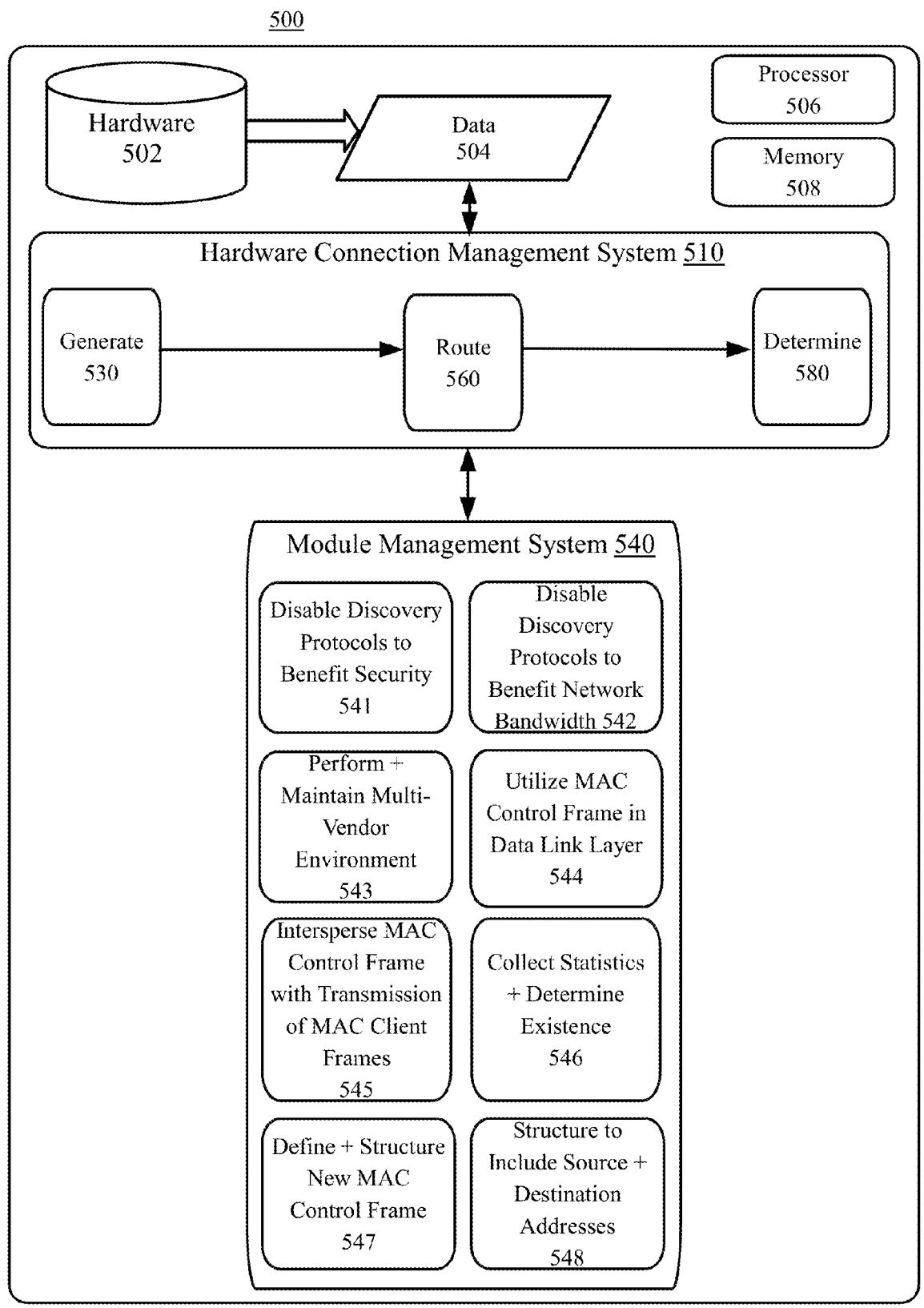
FIG. 5 is a flowchart illustrating a method of hardware connection management using a MAC control frame, according to embodiments.

FIG. 5 shows an example system 500 for hardware connection management using a MAC control frame, according to embodiments. The example system 500 may include a processor 506 and a memory 508 to facilitate implementation of hardware connection management. The example system 500 may include hardware 502 such as a database configured to maintain data used for hardware connection management. In embodiments, the example system 500 may include a hardware connection management system 510. The hardware connection management system 510 may be communicatively connected to the hardware 502, and be configured to receive data 504 related to hardware connection management. The hardware connection management system 510 may include a generating module 530 to generate a MAC control frame, a routing module 560 to route the MAC control frame from a first hardware port, and a determining module 580 to determine whether a hardware switch exists between the first and second hardware ports. The hardware connection management system 510 may be communicatively connected with a module management system 540 that includes one or more modules for implementing aspects of message management.

In embodiments, a set of discovery protocols may be disabled to benefit security at module 541. Aspects of the disclosure relate to the recognition that, in some situations, discovery protocols used by network environments to indicate the physical and logical locations of network components may be associated with challenges related to data security (e.g., the physical and logical topology of the network may be accessed by unauthorized users). Accordingly, aspects of the disclosure relate to disabling one or more discovery protocols in order to benefit security of the network environment. Generally, disabling can include turning off, removing, decommissioning, invalidating, deactivating, or otherwise rendering the set of discovery protocols inoperative. The set of discovery protocols may include network communication protocols that allow for automatic detection of devices and services offered by the components of a computer network. As examples, the set of discovery protocols may include Link Layer Discover Protocol (LLDP), Universal Description Discover and Integration (UDDI), Session Announcement Protocol (SAP), Dynamic Host Configuration Protocol (DHCP), or the like. In embodiments, disabling the set of discovery protocols may include configuring a network interface card, network controller, hardware connection management engine, or service processor to deactivate the set of discovery protocols with respect to the network environment. Accordingly, utilizing a MAC control frame to ascertain whether a hardware switch is present between a first hardware port and a second hardware port may positively impact network security of the network environment (e.g., information regarding the configuration of the network environment may be protected against unauthorized users). Other methods of disabling the set of discovery protocols to benefit security are also possible.

In embodiments, a set of discovery protocols may be disabled to benefit network bandwidth at module 542. Aspects of the disclosure relate to the recognition that, in some situations, discovery protocols used by network environments to indicate the physical and logical locations of network components may be associated with challenges related to network bandwidth usage (e.g., performance of these discovery protocols may use network bandwidth). Accordingly, aspects of the disclosure relate to disabling one or more discovery protocols in order to benefit network bandwidth of the network environment. Generally, disabling can include turning off, removing, decommissioning, invalidating, deactivating, or otherwise rendering the set of discovery protocols inoperative. As described herein, the set of discovery protocols may include network communication protocols that allow for automatic detection of devices and services offered by the components of a computer network (e.g., LLDP, UDDI, SAP, DHCP). In embodiments, disabling the set of discovery protocols may include configuring a network interface card, network controller, hardware connection management engine, or service processor to deactivate the set of discovery protocols with respect to the network environment. As an example, in a situation where an LLDP discover protocol using 200 megabits of network bandwidth was used to monitor network topology, disabling the set of discover protocols may reduce the total network bandwidth by 200 megabits. In this way, utilizing a MAC control frame to ascertain whether a hardware switch is present between a first hardware port and a second hardware port may positively impact network bandwidth usage of the network environment (e.g., network bandwidth usage may be reduced). Other methods of disabling the set of discovery protocols to benefit network bandwidth are also possible.

In embodiments, the performing and maintaining of a multi-vendor environment may occur at module 543. The hardware connection management may be performed in a multi-vendor environment. Aspects of the disclosure relate to the recognition that, in some multi-vendor situations, different vendors may have different goals, purposes, or interests with respect to the network, such that the use of discovery protocols may not be desirable (e.g., data or information regarding the topology of the network may be accessed by unauthorized parties). Accordingly, aspects of the disclosure relate to performing aspects of hardware connection management in a multi-vendor environment (e.g., rather than potentially compromising network security using other discover protocols). Generally, performing may include carrying-out, implementing, completing, achieving, or otherwise executing hardware connection management in a multi-vendor environment. The multi-vendor environment may include a computing network environment in which a plurality of organizations, entities, corporations, associations, communities, or other vendors are involved. As an example, the multi-vendor environment may include a collaborative network configuration between a Company A, a Company B, and a Company C, where each company manages assets within the same network. In embodiments, performing may include generating a MAC control frame, routing the MAC control frame from a first hardware port, and determining whether a hardware switch exists between a first and second hardware port based on whether the second hardware port receives the MAC control frame. In this way, the presence of a hardware switch between two hardware ports may be ascertained without exposing the topology of the entire network environment. In embodiments, the multi-vendor environment may be maintained with neither a hardware modification nor a protocol addition. Generally, maintaining can include sustaining, continuing, regulating, protecting, or otherwise preserving the multi-vendor environment without hardware modifications or protocol additions. In embodiments, maintaining may include denying or preventing changes to the physical topology, logical topology, or communication protocols used by the network environment. In this way, utilization of a MAC control frame to ascertain the presence of a hardware switch between two hardware ports may be performed in a multi-vendor environment without impacting the security of network topology. Other methods of performing hardware connection management and maintaining the multi-vendor environment are also possible.

In embodiments, the MAC control frame may be utilized in a data link layer at module 544. Aspects of the disclosure relate to the recognition that, in some situations, computer communication operations may be performed in one more of a set of abstraction layers (e.g., physical layer, data-link layer, network layer, transport layer, session layer, presentation layer, application layer). Accordingly, aspects of the disclosure relate to utilizing the MAC control frame in a data link layer of an open system interconnection model. Generally, utilizing may include employing, leveraging, sending, transmitting, handling, or otherwise managing the MAC control frame in the data link layer. In embodiments, the data link layer may include an abstraction layer of an open system interconnection model that is configured to transfer data between network nodes in a wide area network (WAN) or between nodes on the same local area network (LAN). The data link layer may be configured to provide the functional and procedural tools to transfer data between network entities. For instance, the data link layer may be configured to address, delivery, and arbiter data frames and protocol data units between devices on the same local area network. In embodiments, utilizing may include using the communication protocols defined by the data link layer to address the MAC control frame (e.g., to a destination location), transmit the MAC control frame to the destination, and monitor for reception of the MAC control frame by the destination location. Other methods of utilizing the MAC control frame in the data link layer are also possible.

In embodiments, the MAC control frame may be interspersed with transmission of a set of MAC client frames at module 545. Aspects of the disclosure relate to the recognition that, in some situations, it may be desirable to perform aspects of hardware connection management without ceasing transmission of network data traffic. Accordingly, aspects of the disclosure relate to interspersing one or more MAC control frames together with transmission of a set of MAC client frames (e.g., such that the MAC control frame may be sent to a second hardware port without delaying or adversely impacting other data payloads). In embodiments, interspersing may include distributing, intermixing, scattering, infusing, or otherwise integrating transmission of the MAC control frame with the set of MAC client frames. The set of MAC client frames may include Ethernet frames, data packets, or other structured format for data payload transmission. In embodiments, interspersing may include transmitting the MAC control frame in between a batch or group of MAC client frames. In embodiments, in situations in which a plurality of MAC control frames are to be transmitted, the plurality of MAC control frames may be divided and transmitted intermittently with the set of MAC client frames. Other methods of interspersing the MAC control frame with the set of MAC client frames are also possible.

In embodiments, collecting and determining may occur at module 546. A set of statistics related to the first and second hardware ports may be collected by the hardware connection management engine. Generally, collecting can include gathering, compiling, accumulating, aggregating, obtaining, or otherwise capturing the set of statistics. The set of statistics may include data or information that describes or characterizes the configuration, network data traffic activity, parameters, or other properties or attributes of the first and second hardware ports. In embodiments, the set of statistics may include a network data traffic activity log that includes a recording of the frames and data packets received by a particular hardware port, the type of frame/data packet, time it was received, size, associated type value identifier/opcodes, and other information. In embodiments, the set of statistics may include a data entry indicating reception of a MAC control frame. In certain embodiments, the set of statistics may include a data entry that indicates lack of reception of a MAC control frame that was expected to be received (e.g., but was absorbed by a hardware switch). In embodiments, collecting may include monitoring (e.g., by the hardware connection management engine) the first and second hardware ports, and compiling the set of statistics based on the network activity of each respective hardware port. In embodiments, the hardware connection management engine may determine whether the hardware switch exists between the first and second hardware ports. The hardware connection management engine may determine whether the hardware switch exists based on the set of statistics related to the first and second hardware ports. Generally, determining can include resolving, deriving, computing, detecting, identifying, discovering, or otherwise ascertaining whether the hardware switch exists between the first and second hardware ports. In embodiments, determining may include examining the set of statistics, and ascertaining whether a data entry of the set of statistics indicates reception of the MAC control frame. In the event that a data entry indicating reception of the MAC control frame is discovered in the set of statistics, it may be determined that a hardware switch is not present between the first and second hardware ports. In the event that no data entry indicating reception of the MAC control frame, or a data entry indicating lack of reception of the MAC control frame, is discovered in the set of statistics, it may be determined that a hardware switch is present between the first and second hardware ports. Other methods of collecting the set of statistics and determining whether the hardware switch exists between the first and second hardware ports are also possible.

In embodiments, defining and structuring may occur at module 547. A new type of MAC control frame may be defined by a user. Aspects of the disclosure relate to the recognition that, in some situations, MAC control frames other than pause frames may be used to ascertain whether a hardware switch is present between two hardware ports of a network. Accordingly, aspects of the disclosure relate to defining a new type of MAC control frame for use in hardware connection management. Generally, defining can include designating, formatting, creating, arranging, organizing, formulating, generating, or otherwise establishing the new type of MAC control frame. The new type of MAC control frame may include a data packet of an Ethernet connection that includes a preamble, header, payload, frame check sequence, and an end of frame (e.g., footer) sequence. The MAC control frame may include a type value identifier that indicates itself as a MAC control frame to other devices in the network. In embodiments, defining the MAC control frame may include selecting a particular function (e.g., operation to be performed by the new type of MAC control frame), and assigning it to the data packet. As an example, functions such as frame retransmission, frame check sequences, interframe gap enforcement, malformed frame discarding, start frame delimiters, MAC address modification, or other types of functions. In embodiments, MAC control frame may be structured to include the new type of MAC control frame. The MAC control frame may be structured by the hardware connection management engine. Generally, structuring can include assembling, organizing, formatting, arranging, constructing, or otherwise configuring the MAC control frame to include the new type of MAC control frame. In embodiments, structuring may include formatting the MAC control frame to include a type value identifier of "0x8808" (e.g., to identify the data packet as a MAC control frame to other devices in the network). In certain embodiments, structuring may include assigning the new type of MAC control frame with a set of opcodes that characterize the new type of MAC control frame. For instance, the set of opcodes may include hexadecimal values that indicate or describe the nature of the operations to be performed by the new type of MAC control frame. Other methods of defining and structuring the new type of MAC control frame are also possible.

In embodiments, the hardware connection management engine may structure the MAC control frame to include both a source address and a destination address at module 548. Aspects of the disclosure relate to the recognition that, in some embodiments, MAC control frames may include source and address destinations to indicate where they originated and where they are to be transmitted in the network environment. Generally, structuring can include assembling, organizing, formatting, arranging, constructing, or otherwise configuring the MAC control frame to include both the source address and the destination address. The source address may include a network location identifier that indicates where (e.g., which hardware port, computing device, network node) the MAC control frame was transmitted from. For instance, the source address may include a unicast address of the station sending the MAC control frame (e.g., pause frame). The destination address may include a network location identifier that indicates where the MAC control is to be transmitted to. For instance, the destination address may include a unique multicast address corresponding to the nature of the operation to be performed by the MAC control frame. As an example, in the event that the MAC control frame includes a pause frame, the destination address may include the multicast address reserved for the pause operation of "01-80-C2-00-00-01." In embodiments, structuring the MAC control frame may include formatting the MAC control frame to include a type field that indicates the reserved value for MAC control frames (e.g., 0x8808), or a MAC control opcode parameter (e.g., 0x0001 for a pause operation). Other methods of structuring the MAC control frame to include a source address, destination address, and other information are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for hardware connection management using a media access control (MAC) control frame, the method comprising:
    generating, by a hardware connection management engine, a MAC control frame;
    routing, by the hardware connection management engine, the MAC control frame from a first hardware port; and
    determining, by the hardware connection management engine based on whether a second hardware port receives the MAC control frame, whether a hardware switch exists between the first and second hardware ports;
further comprising:
    detecting, by the hardware connection management engine, reception of the MAC control frame by the second hardware port; and
    determining, by the hardware connection management engine based on reception of the MAC control frame by the second hardware port, an absence of the hardware switch between the first and second hardware ports which indicates a direct connection between the first and second hardware ports; and
    sending a set of network data traffic across the first and second hardware ports without utilizing the hardware switch.

2. The method of claim 1, further comprising:
    detecting, by the hardware connection management engine, a lack of reception of the MAC control frame by the second hardware port; and
    determining, by the hardware connection management engine based on the lack of reception of the MAC control frame by the second hardware port, a presence of the hardware switch between the first and second hardware ports.

3. The method of claim 1, further comprising:
    structuring, by the hardware connection management engine, the MAC control frame to include a pause frame.

4. The method of claim 2, further comprising:
    sending a set of network data traffic across the first hardware port, the hardware switch, and the second hardware port.

5. The method of claim 1, further comprising:
    introducing, for the first hardware port, a first Network Interface Card (NIC) port; and
    introducing, for the second hardware port, a second NIC port.

6. The method of claim 1, further comprising:
    disabling a set of discovery protocols to benefit security.

7. The method of claim 1, further comprising:
    disabling a set of discovery protocols to benefit network bandwidth.

8. The method of claim 1, further comprising:
    performing the hardware connection management in a multi-vendor environment; and
    maintaining, with neither a hardware modification nor a protocol addition, the multi-vendor environment.

9. The method of claim 1, further comprising:
    utilizing the MAC control frame in a data link layer.

10. The method of claim 1, further comprising:
    interspersing the MAC control frame with transmission of a set of MAC client frames.

11. The method of claim 1, further comprising:
    collecting, by the hardware connection management engine, a set of statistics related to the first and second hardware ports; and
    determining, by the hardware connection management engine based on the set of statistics related to the first and second hardware ports, whether the hardware switch exists between the first and second hardware ports.

12. The method of claim 1, further comprising:
    defining, by a user, a new type of MAC control frame; and
    structuring, by the hardware connection management engine, the MAC control frame to include the new type of MAC control frame.

13. The method of claim 1, further comprising:
    structuring, by the hardware connection management engine, the MAC control frame to include both a source address and a destination address.

14. The method of claim 1, wherein the generating, the routing, and the determining each occur in a dynamic fashion to streamline hardware connection management.

15. The method of claim 1, wherein the generating, the routing, and the determining each occur in an automated fashion without user intervention.

16. A system of hardware connection management using a media access control (MAC) control frame, the system comprising:
    a memory having a set of computer readable computer instructions, and
    a processor for executing the set of computer readable instructions, the set of computer readable instructions including:
    generating, by a hardware connection management engine, a MAC control frame;
    routing, by the hardware connection management engine, the MAC control frame from a first hardware port; and
    determining, by the hardware connection management engine based on whether a second hardware port receives the MAC control frame, whether a hardware switch exists between the first and second hardware ports;
    further comprising:
    detecting, by the hardware connection management engine, reception of the MAC control frame by the second hardware port; and
    determining, by the hardware connection management engine based on reception of the MAC control frame by the second hardware port, an absence of the hardware switch between the first and second hardware ports which indicates a direct connection between the first and second hardware ports; and
    sending a set of network data traffic across the first and second hardware ports without utilizing the hardware switch.

17. A non-transitory computer readable storage medium comprising a computer program product for hardware connection management using a MAC control frame, wherein the non-transitory computer readable storage medium having a program instructions executable by a processor to cause the processor to perform a method comprising:

generating, by a hardware connection management engine, a MAC control frame;

routing, by the hardware connection management engine, the MAC control frame from a first hardware port; and determining, by the hardware connection management engine based on whether a second hardware port receives the MAC control frame, whether a hardware switch exists between the first and second hardware ports;

further comprising:

detecting, by the hardware connection management engine, reception of the MAC control frame by the second hardware port; and determining, by the hardware connection management engine based on reception of the MAC control frame by the second hardware port, an absence of the hardware switch between the first and second hardware ports which indicates a direct connection between the first and second hardware ports.

18. The computer program product of claim 17, wherein at least one of:

the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to the remote data processing system for use in a second computer readable storage medium with the remote data processing system.

* * * * *